Figure 1:
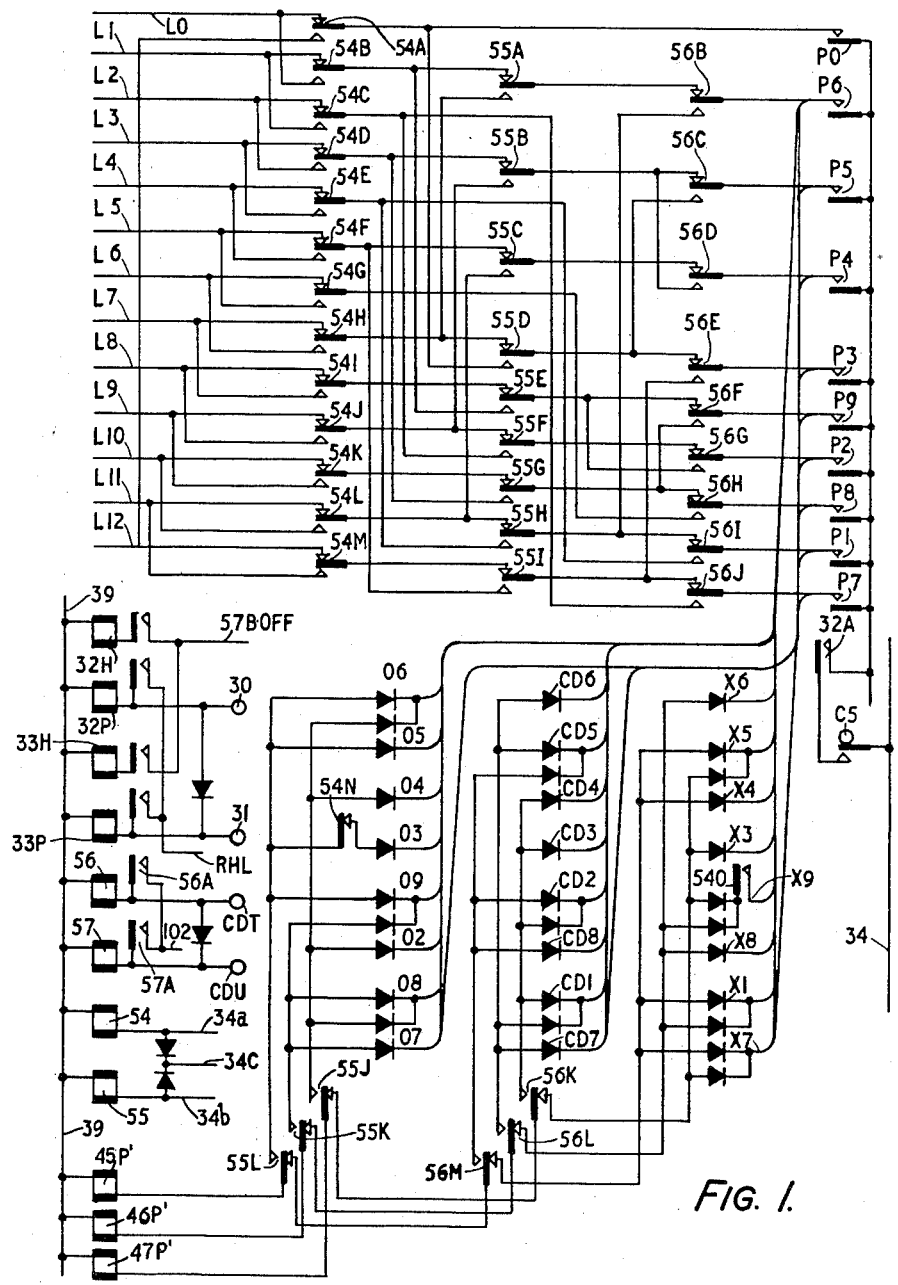

Dec. 20, 1960  A. J. KEEN  2,965,296
DATA CHECKING APPARATUS
Filed Sept. 11, 1956  3 Sheets-Sheet 1

INVENTOR
ALBERT JOHN KEEN
BY
ATTORNEY

Dec. 20, 1960  A. J. KEEN  2,965,296
DATA CHECKING APPARATUS
Filed Sept. 11, 1956  3 Sheets-Sheet 2

INVENTOR
ALBERT JOHN KEEN
BY
ATTORNEY

INVENTOR
ALBERT JOHN KEEN
BY [signature]
ATTORNEY

United States Patent Office 2,965,296
Patented Dec. 20, 1960

2,965,296

DATA CHECKING APPARATUS

Albert John Keen, Letchworth, England, assignor to International Computers and Tabulators Limited, London, England, a British company Filed Sept. 11, 1956, Ser. No. 609,218

Claims priority, application Great Britain Sept. 13, 1955

4 Claims. (Cl. 235—153)

This invention relates to apparatus for checking the accuracy of data.

It has already been proposed to employ a calculator to produce a check digit which is the remainder obtained by dividing a data item by a prime number, such as 11 or 13. The appropriate check digit is associated with each data item, so that by calculating a new check digit value after each transcription of a data item and comparing this value with the check digit associated with the item, the correctness of the transcription may be checked.

A data item generally comprises a group of characters. Each character may be any one of a predetermined set, such as the decimal digits 0 to 9, or the letters of the alphabet. If the number of characters in a set is greater than the number used as a base for calculating the check digit, then at least two or more of the characters must have the same check digit and therefore are interchangeable without an error being detected. For example, if the check digit base is three, then the digits 0, 3, 6 and 9 have the check digit, and the number 3467 has the same check digit as 9407 or 9467 or 3497 etc. Hence, if the number of characters in a set is large, then the check digit base should also be large, which leads to a complex calculating circuit.

It has also been proposed to utilise two check digit bases. Each digit item is divided separately by each of the bases, so that two check digits are associated with each item. Although this does provide a better check than either base used alone, there are still an appreciable number of simple errors which may not be detected.

Accordingly, it is an object of the present invention to provide improved data checking apparatus utilising two or more check digit calculators, in which the result produced by at least one of the calculators is dependent upon the result produced by another, or the other, check digit calculator, as well as upon the data item entered into said one calculator.

It is a further object of the invention to employ first and second check digit calculators arranged so that a data item including characters from one set is entered into the first calculator in one form, and a data item including characters of a second set is entered into the first calculator in a different form and is also entered into the second calculator.

It is another object of the invention to utilise the first calculator for checking numerical data items, and the first and second calculators together for checking alphabetic data items.

According to one aspect of the invention data checking apparatus comprises two or more check digit calculators having data input means, and means for effecting additional entries into one of said calculators in dependence upon results calculated by at least one other of said calculators, whereby the check digit calculated by said one calculator is dependent upon the check digit calculated by said other calculator as well as upon the data entered into said one calculator.

According to another aspect of the invention data checking apparatus comprises a first and a second check digit calculator having data input means, and means for entering a character from data item which consists of characters from one set into the first calculator and for entering the same character from a data item which includes characters of another set into the first and second calculators. The two sets of characters may be numerical and alphabetic, respectively, the alphabetic characters being allocated numerical values. The two calculators may each operate to effect division of an entered value by a prime number.

Figure 2:
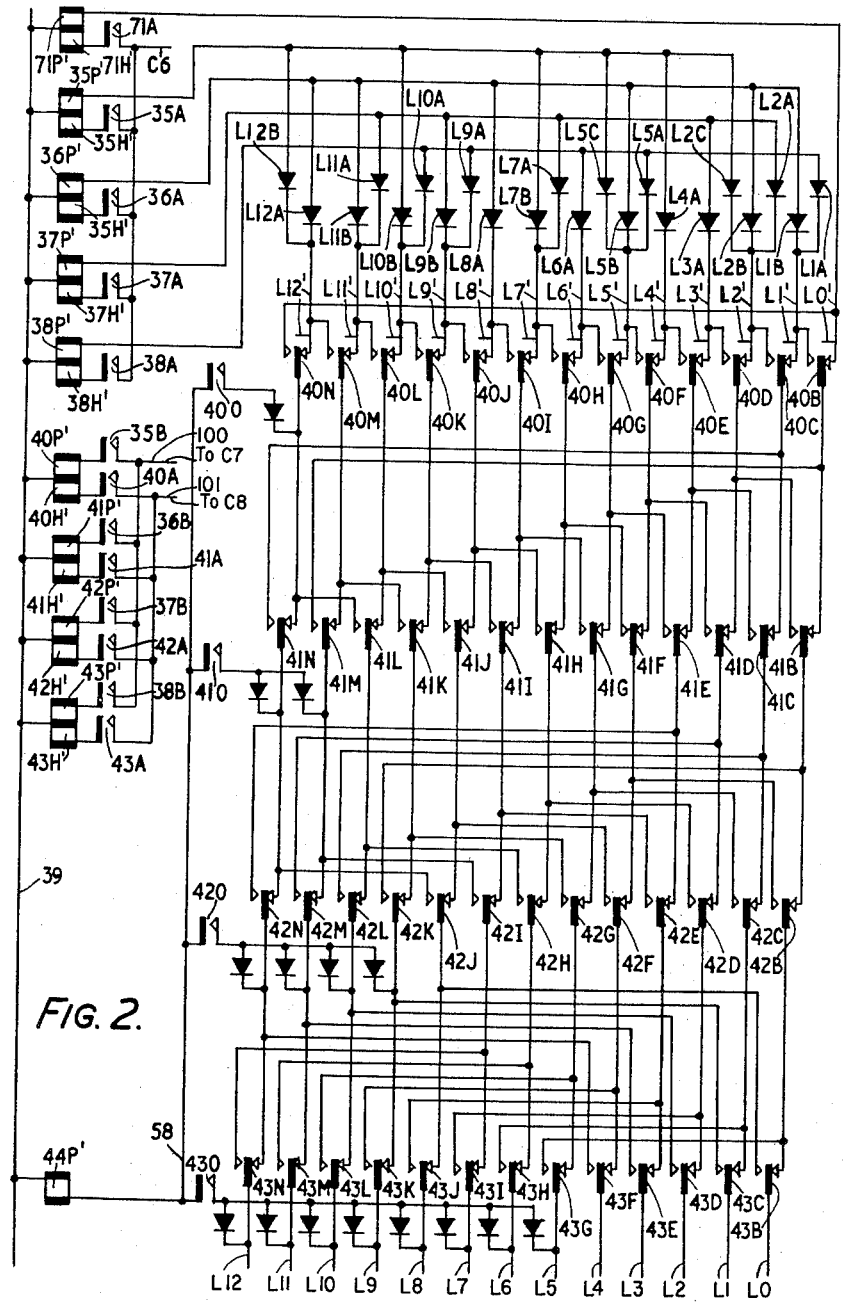
Figures 3, 4:
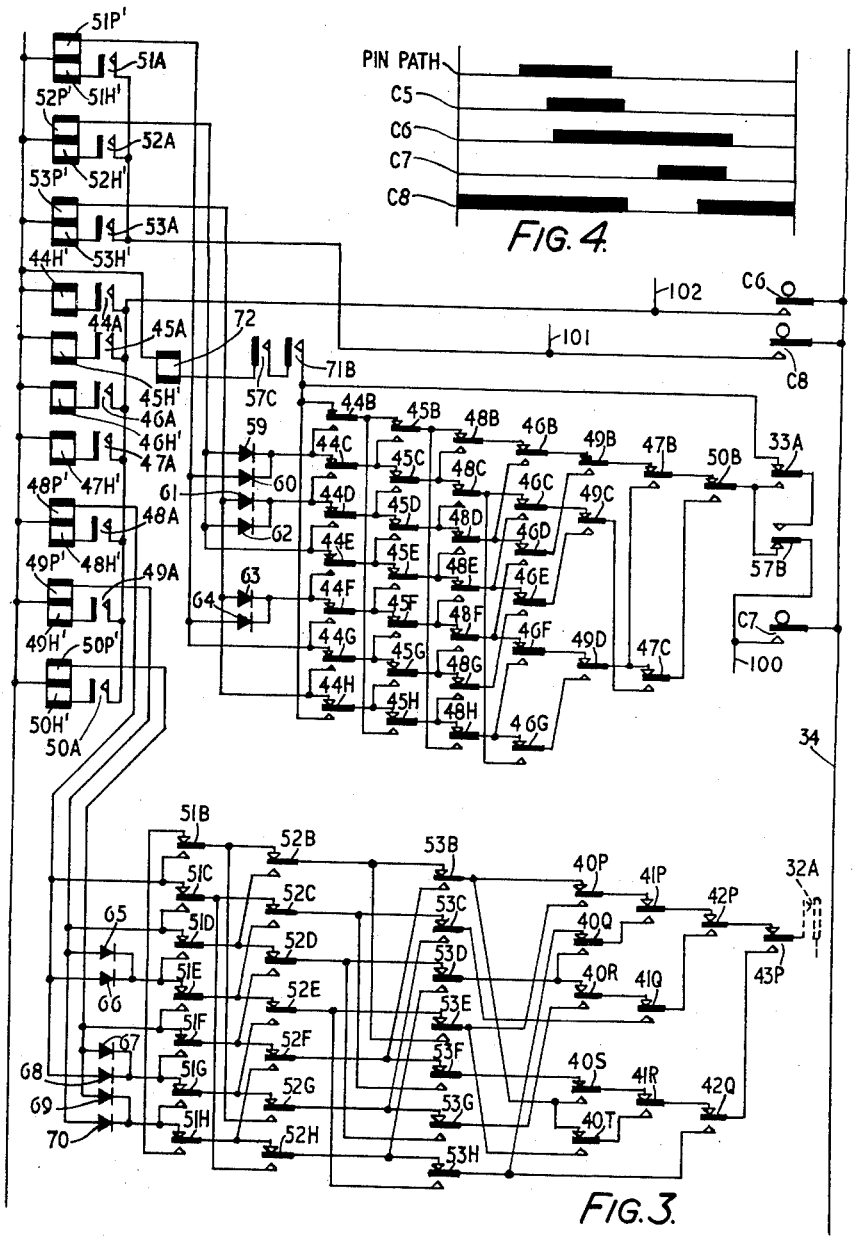

The invention will now be described by way of example, with reference to the accompanying drawings, in which:

Figures 1 to 3 taken together form a circuit diagram of check digit calculating apparatus utilising a base of 13 for numerical entries and bases of 7 and 13 for entries including alphabetic characters.

Figure 4 is a cam timing chart.

The invention will be described as applied to a record card punching machine similar to that described in British patent specification No. 621,697. In this machine, data is set up, character by character, on a keyboard to control entry into a storage device. The output of the storage device controls the card punching mechanism by the selective energisation of the punch selector magnets.

Each of the punch selector magnets for the index points 0–9 has connected in parallel with it a relay (not shown), the contacts of which control entry of data into the check digit calculating arrangement. These contacts are referenced P0–P9 (Figure 1), corresponding to the index points. Relays 54 and 55 are connected in parallel with the punch selector magnets for the index points "X" and "O" respectively, by wires 34a and 34b. A wire 34c is connected through isolating diodes to the wires 34a and 34b and also to the punch selector magnet for the "Y" index point, so that both the relays 54 and 55 are energised when this selector magnet is energised.

Digital characters are recorded in the card by a single hole at the index point corresponding to the value of the digit. Alphabetic characters are recorded by the combination of a hole in one of the index point positions "O," "X" and "Y," and a hole in one of the index points 1–9. The particular coding used is the same as that which is described in British patent specification No. 704,764.

The check digit calculating arrangement operates in one mode when the data item consists solely of characters in a numeric set, that is, the digits 0–9, and in a different mode when the item consists partly, or solely, of characters in the alphabetic set. The operation for a purely numeric item will be considered first.

It will be assumed that the number 673(06) has been entered into the storage device of the punch and is to be recorded in the card. The last two digits are the check digit which is associated with the value 673. This check digit is the remainder obtained by multiplying the value by nine hundred and sixty and dividing the product by thirteen. The value is first multiplied by 960 in order to provide a uniform system of calculation for both decimal and sterling values. The least sterling value normally required in accounting operations is one farthing. If a farthing is regarded as the basic denominational unit, then the units of pounds must be multiplied by 960 to bring the sterling value to a uniform scale of notation. Since the units of pounds is the lowest decimal scale digit in a sterling value, it is convenient to treat the units of pounds and the units position of a decimal value as being equivalent. This also results in the useful feature that the check digit for the units digit is always different from that digit.

The remainders for the digits 0–9 are set out below, for the units position with division by 13, and for the units, tens and hundreds position with a prior multiplication by 960.

TABLE 1
Remainder

| N | $\frac{N}{13}$ | $\frac{N.960}{13}$ | $\frac{10N.960}{13}$ | $\frac{100N.960}{13}$ |
| --- | --- | --- | --- | --- |
| 0 | 0 | 0 | 0 | 0 |
| 1 | 1 | 11 | 6 | 8 |
| 2 | 2 | 9 | 12 | 3 |
| 3 | 3 | 7 | 5 | 11 |
| 4 | 4 | 5 | 11 | 6 |
| 5 | 5 | 3 | 4 | 1 |
| 6 | 6 | 1 | 10 | 9 |
| 7 | 7 | 12 | 3 | 4 |
| 8 | 8 | 10 | 9 | 12 |
| 9 | 9 | 8 | 2 | 7 |

The digits of the value are read out to the punching mechanism in turn, starting with the most significant digit, in the conventional manner. Hence, when the first digit is entered into the check digit calculating arrangement, the denominational significance of this digit is not known. Accordingly, each digit is treated on entry as though it were the units digit, the remainder formed on division by 13 after multiplication by 960 is combined with the stored value resulting from any previous digit entries, and the remainder formed on dividing ten times this result by thirteen is then stored. The steps involved in entering the number 673(06) are set out in detail to illustrate the method of calculation.

TABLE 2

| Step | Entry | Remainder | Remainder added | Sum | Stored Remainder |
| --- | --- | --- | --- | --- | --- |
| 1 | 6 | 1 | 0 | 1 | 10 |
| 2 | 7 | 12 | 10 | 9 | 12 |
| 3 | 3 | 7 | 12 | 6 | 8 |
| 4 | 0 | 0 | 8 | 8 | 2 |
| 5 | 6 | 11 | 2 | 0 | 0 |

Thus, on step 1, the digit 6 is entered and produces a remainder of one. This is the correct remainder for 6 as a units digit, as shown in Table 1 above. There was no previous entry, so that zero is added to the remainder on division by 13 of one. The remainder of ten times this sum, namely ten, is then calculated and stored. Hence, the stored remainder corresponds to the check digit for sixty.

The apparatus performs similar cycles of operation on steps 2 and 3. It will be seen that the sum at step 3 is six, which is the check digit for 673. However, the cycle is completed by storing the remainder as eight. At step 4, zero is added to the stored remainder of the previous step, and the sum is again multiplied by ten, to give a new stored remainder of two. In Table 2, the sum given in the fifth column is calculated in a radix of 13, any carry being ignored.

After entry of the check digit, we want the stored remainder to be zero if the value has been entered correctly. The entry circuit is modified during entry of the check digit so that it is effectively subtracted and so that the rest of the operation cycle is unchanged. The relation between the entered check digit and the calculated remainder is set out below in Table 3.

TABLE 3

| Entry | Remainder |
| --- | --- |
| 0 | 0 |
| 1 | 4 |
| 2 | 8 |
| 3 | 12 |
| 4 | 3 |
| 5 | 7 |
| 6 | 11 |
| 7 | 2 |
| 8 | 6 |
| 9 | 10 |

It will be seen that the remainder is the complement to thirteen of the remainder obtained on multiplying by ten and dividing by thirteen the remainder obtained on multiplying the entry by ten and dividing by thirteen. That is, the check digit is entered in such a way that it is effectively subtracted from the check digit produced by the value entry, taking into account the ten times multiplication which occurs on each digit entry.

Hence, at step 5, the entry of six produces a remainder of eleven, which, added to the previous stored remainder of two, produces a final stored remainder of zero. This is taken as an indication that the value and the check digit have been correctly entered. For example, the final stored remainder would have been three if the entry had been made in error as 676(03), and the error would have therefore been detected.

Alphabetic characters are given numerical values by adding together the values represented by their punched representations, the zone positions "O," "X" and "Y" being assigned the values 10, 20 and 30 respectively. For example, the letter A is represented by holes in the "1" and "Y" positions of a card and therefore has the numerical value of thirty-one.

A data item which includes one or more alphabetic characters is treated as an alphabetic data item, so that an item consisting of a mixture of numerical and alphabetic characters is treated in the same way as one which consists entirely of alphabetic characters.

The check digit for an alphabetic data item is equal to the remainder obtained by multiplying the equivalent value, taking account of the numerical values assigned to alphabetic characters, by nine hundred and sixty and dividing the product by ninety-one. The calculation is performed by utilising the calculator operating in the scale of thirteen in conjunction with a second calculator operating in the scale of seven. The second calculator registers the multiples of thirteen in any value stored by the two calculators, so that any value between zero and ninety may be registered by the two calculators in conjunction. For example, the value seventy-three is equal to 8+5.13, so that the first calculator would register eight and the second calculator would register five.

For convenience, the calculators operating in the scales of thirteen and seven will be referred to hereinafter as the "A" and "B" calculators respectively. The two calculators operate in a generally similar manner, except that the "B" calculator not only receives entries from the input storage device, but also from the "A" calculator.

It will be assumed that the item 6E is to be entered. The character E is represented by holes in the "X" and "2" positions of the card, giving a numerical value of twenty-two. Hence the equivalent value of the item is 60+22, that is, 82. The check digit is the remainder of $$\frac{82 \times 960}{91}$$

which is 5. The item will therefore be entered as 6E(05).

The entry of six will produce a stored remainder of ten in the "A" calculator, in the manner already described. However, the remainder of $$\frac{6 \times 960}{91}$$

is 27, which is 1+2.13. Hence, the input entry of six will also produce an entry of two in the "B" calculator. This entry of two is passed to an adding circuit and the sum from the adding circuit is multiplied by ten and the remainder, in the scale of seven, is stored, in a manner comparable to the operation of the "A" calculator. There are no other entries to the adding circuit at this time, since the first character of the items is being entered. The stored remainder is derived from $$\frac{2.10}{7}$$

which gives a remainder of six.

The check digit for sixty is eighty-eight, which is equal to 10+6.13. Hence the stored remainder of ten in the A calculator and six in the B calculator is equal to the check digit of ten times the entry. This is only true when the entry produces a sum in the "A" calculator of zero or one, since these are values which when multiplied by ten are less than thirteen. On the other hand, the remainder for a sum of eight for example, is eighty or 2+6.13. The multiples of thirteen arising in the multiplication by ten in the "A" calculator must be added to the stored remainder in the "B" calculator in order to obtain the correct registration. This addition is performed during the entry of the next character. It is convenient to delay the addition in this way, because the amount to be added is determined by the sum in the "A" calculator, and not solely by the entry.

In order to clarify the entry of this first character, the following explanation of the principles of operation of the calculators is given.

Each character is entered into the "A" calculator by the closing of one of the pin contacts P0 to P9, shown in the upper part of Figure 1, associated with the corresponding numerical positions of a card column. The closing of one of these contacts provides an entry path from the supply line 34 to one of a number of lines L0 to L12 referenced, for clarity, to correspond to the check digit associated with the entered digit. Contacts of relays 54, 55 and 56 are provided in each of these paths to modify this line selection. The relays 54 and 55, it will be recalled, are operated in response to the presence of holes in the O, X and Y positions of a card column and modify the selection of one of the lines L0 to L12 to correspond to the check digit associated with the numerical values as modified by the presence of the O, X or Y punchings.

The contacts of relay 56 are operated during the entry of check digits to effectively subtract these values from the values stored in the calculators.

The paths provided by the lines L0 to L12, as shown in Figure 2, then pass through contacts of relays 40 to 43. These relays are used to store the results of previous calculations and the contacts are arranged in a conventional adding circuit operating in the scale of thirteen. A carry circuit is provided in this adding circuit so that if the addition of two values in the A calculator exceeds 13, and "B" calculator total is advanced by one and the new remainder is left in the "A" calculator.

After passing through the adding network the lines, referenced L1' to L12' at the output side of the adding chain, are connected by a recording network of diodes L1A and B to L12A and B to a group of relays 35 to 38 which register the appropriate remainder. The diode network is arranged to recode the output from the selected line so that the value registered by the relays 35 to 38 is the remainder corresponding to ten times the digit represented by the selected line.

The operating cycle for the entry of each character is divided into two periods, and the character is entered during the first of these. During the second period, the value registered by the relays 35 to 38 is transferred and stored on the relays 40 to 43, thus setting the adding chain in readiness for the entry of the next character.

Characters are also entered during the first period into the "B" calculator by means of the contacts P0 to P9 (Figure 1) over a circuit comprising three diode networks. One of these networks is selected to be effective, in dependence upon the type of character entered, by means of contacts of relays 55 and 56. For example the network containing diodes whose references are prefixed "CD" is effective when check digits are being entered, since the contacts of relay 56 are transferred at this time, and the network comprising diodes prefixed "O" is effective whenever the relay 55 is operated. In other cases the network comprising diodes prefixed "X" is effective.

The numeral suffix in the reference to each diode denotes the particular one of the contacts P0 to P9 with which it is associated. The "O" and "X" diode networks are arranged to code the entered digit into that number which is the quotient resulting from the division of the check digit of the entered character by thirteen.

This number is set up in binary code form as the "B" calculator entry digit on relays 45 to 47.

During this same period the circuit shown in the lower half of Figure 3 is also operative to set up a group of relays 48 to 50 to modify the adding circuit of the "B" calculator in dependence upon the results of the previous cycle of calculations in both "A" and "B" calculators. A path is provided through contacts 32A (Figures 1 and 3) and then through contacts of the "A" calculator storage relays 40 to 43 and contacts of relays 51 to 53 to operate the modifier relays 48 to 50. The relays 51 to 53 are the storage relays associated with the "B" calculator. This modification is necessary since the new number to be stored in the "B" calculator depends not only upon the addition of the new number to be entered to the existing number stored but also upon the additional multiples of thirteen created in the previous cycle when the remainder in the A calculator is multiplied by the ten during the "A" calculator recording operation.

Finally, during the second period of the entry cycle the adding chain of the "B" calculator, shown in the upper half of Figure 3, is effective over a path extending through contacts C7 and 57B and then through contacts of the modifier relays 48 to 50 and the entry digit relays 45 to 47 and a diode coding network to set the B calculator storage relays 51 to 53 to represent the new number corresponding to a "B" digit for ten times the value of the entered character.

Thus, in the example given, 6 is entered by contacts P6, line L1 of the A calculator is selected, the relays 36 and 38 are operated, and a remainder of ten is stored in binary coded form by the operation of relays 41 and 43 representing two and eight respectively. In the B calculator the entry of 6 is effective through diode X6 to set entry relay 46, which represents two in binary code. Since there are no previous totals registered by either A or B calculators the relay 46 is the only relay operated in the "B" calculator adding chain so that the B calculator storage relays 52 and 53 are operated, representing respectively the binary digits 2 and 4, i.e. the sum of 6 is stored in the B calculator.

It has already been noted that the relay 54 is energised whenever the "X" punch magnet is energised. This relay will be energised when punching the letter E, which is represented by "X" and "2." Contacts of this relay modify the circuits of both the "A" and "B" calculators, so that closing of the contacts P2 will produce results corresponding to an entry of twenty-two.

Closing of contacts P2 first causes selection of line L8 in the "A" calculator and the adding circuit modifies this selection to correspond to line $L5^1$ and also sets up the carry relay 44 to enter one into the B calculator. The recoding circuit then causes a remainder of eleven to be stored in the "A" calculator on relays 40, 41 and 43.

In the "B" calculator, the "X" network of diodes is effective. There is no diode X2, so that closure of contacts P2 gives rise to an entry of zero, none of the relays 45–47 being operated. In the modifier circuit the relays 52 and 53 are operated, representing the B calculator stored sum, and the relays 41 and 53 are operated, representing the quotient resulting from calculation of the stored remainder in the A calculator in the previous cycle. Thus, the modifier relays 49 and 50 which represent a modifier digit value of six are set up. The adding circuit is conditioned by these relays and also by the concurrent entry of the "A" calculator carry digit by relay 44 so that the sum "seven" registered by the "B" calculator is effectively zero since it is equal to the scale of the adding circuit.

At the end of this entry cycle, therefore, the check digit of the entered characters 6E, namely, five as represented by the selection of line L5¹ in the "A" calculator and a sum of zero in the "B" calculator has been subjected to multiplication by ten in the "A" calculator. The multiplication, however, is incomplete since the digit representing the number of multiples of thirteen arising therefrom has not yet been entered into the "B" calculator. As explained, this entry takes place during the next cycle, and the operation of relays 40, 41 and 43 then causes a "B" calculator modifier digit of three to be added in the adding chain by the operation of relays 48 and 49. Thus, the effective amount registered is 11+3.13. This amount of fifty is ten times the check digit of the entered item, as explained in connection with the entry of a numerical item. The circuit of the "B" calculator is modified during entry of the check digit in a similar manner to the "A" calculator. It will be apparent, therefore, that both calculators will register zero after entry of the check digit.

The control of the calculating circuits for entry of numerical or alphabetic items and of the check digits associated with the items is effected by relays which are energised at the appropriate times by the sensing of holes in the control card of the punch. Alternatively, a column commutator of known form may be used instead of the control card and the associated sensing mechanism.

It will be appreciated that the calculators may operate in other scales of notation. For example, the "B" calculator may operate in a scale of three, so that the check digit of an item is the remainder obtained on division by thirty-nine. Alternatively, more than one "B" calculator may be provided. For example, check digits based on division by sixty-six may be obtained by employing an "A" calculator operating in the scale of eleven, and two "B" calculators operating in the scales of two and three respectively.

Taking as an example the group of numbers and letters 67AE31, the fact that it is a mixed group requires that both the numerical and alphabetical facilities of the apparatus be brought into effect. Numerical facilities only are brought into operation by applying a negative potential (by appropriate manual plugging to a voltage source, for example) to line 30 whereby relay 32 is operated. When alphabetic facilities are required, the negative potential is plugged to line 31 which results in the operation of relay 33. By virtue of a connection through a diode between lines 30 and 31, the relay 32 is also operated and the related contacts of the two relays are closed. Of these, contacts 32A prepare an input circuit to the network of Figure 1 which is completed each time contacts C5 are closed by an operating cam. Contacts C5 are one of a group controlled by four cams referred to as cams 5, 6, 7 and 8, the relative timing of the operation of which is illustrated in Figure 4.

Upon the first digit 6 of the number letter group of the example being sensed contacts P6 are closed by the operation of their associated input relay (not shown) and shortly afterwards contacts C5 close to complete a circuit from supply line 34 through contacts C5, 32A, P6 the "one" value line L1, the same line L1 (Figure 2), the adding circuit of the A calculator, the two rectifiers L1A and L1B associated with line L1¹ at the output side of the adding circuit and the pick-up windings 36P¹ and 38P¹ of two transfer relays 36 and 38 to return line 39. These transfer relays are two of a group of four transfer relays 35–38 which correspond to the binary values 1, 2, 4 and 8 respectively and the energisation of relays 36 and 38 as a result of completion of the circuit from line 75

34 to line 39 closes contacts 36A and 38A to complete energising circuits for the hold windings 36H¹ and 38H¹ via cam operated contacts C6 to line 34.

Relays 36 and 38 are thus held operated for so long as cam 6 holds its associated contacts C6 closed. The operation of these relays effectively registers the value ten, which represents ten times the remainder of division by thirteen of nine hundred and sixty times the value six which was entered.

Contacts 36B and 38B complete circuits from line 34 through cam operated contacts C7 and line 100 to the pick-up windings 41P' and 43P' of relays 41 and 43 of a group of "A" check digit storage relays 40–43. Relays 41 and 43 are thus operated and held operated while cam 7 holds contacts C7 closed. Contacts 40A–43A are arranged to complete holding circuits to line 34 over cam operated contacts C8 and line 101 to the hold windings of relays 40–43; so that with contacts 41A and 43A closed the hold windings of relays 41 and 43 are maintained energised so long as cam 8 holds contacts C8 closed.

Relays 41 and 43 operate their associated contacts 41B–R and 43B–P in the networks of Figures 2 and 3 to condition these networks for the next entry. The quotient obtained upon division by thirteen of the remainder of nine hundred and sixty over ninety-one times the value 6, is also entered into the "B" calculator at the same time as into the "A" calculator, in the following manner.

The connections from the P contacts to the network of Figure 1 also extend to three columns of rectifiers designated O, X and CD, the individual connections not being shown in the drawing but being indicated by references comprising the prefix O, X or CD and the number of the P contact to which each is connected. Thus contacts P6 are connected to the rectifiers associated with the lines referenced O6, X6 and CD6.

The circuit from line 34 through contacts P6 is thus extended over line X6, the rectifier associated with line X6, contacts 56L and 55K and winding 46P' to line 39. Relay 46 at its contacts 46A (Figure 3) completes a circuit for its hold winding 46H' via cam contact C6 to line 34, and at its contacts 46B—46G it conditions the upper of the two networks of Figure 3.

The lower of the two networks of Figure 3 serves to add together the number of multiples of thirteen in the value obtained in the "A" calculator in response to entry of the previous digit on multiplying the calculated remainder by ten before feeding it to the store and the value stored on the relays 51–53 as a result of the entry of the previous digit and to insert the result in the upper network of Figure 3. At the present stage however there are no check digits to be added, so that when contacts C5 close a circuit from line 34 is extended over contacts C5, 32A, 43P, 42P, 41P, 40P, 53B, 52B and 51B, but it does not affect relays 48, 49 and 50 which transfer the results obtained by operation of this network into the upper network.

Upon the closing of contacts C7 a circuit is extended from line 34 through contacts 57B, 50B, 47B, 49B, 46B (reversed), 48D, 45D, 44D, rectifiers 61 and 62 and windings 52P' and 53P' to line 39. Windings 52P' and 53P' are pick-up windings of two of the three relays 51–53 which respectively register the "B" check digit values 1, 2 and 4 and the energisation of windings 52P' and 53P' over the circuit just detailed operates relays 52 and 53 to store the value six. Contacts 52A and 53A are closed upon operation of their associated relays to complete circuits for the hold windings 52H' and 53H' over contacts C8.

Thus the entry of the value six by the closing of contacts P6 results in the registration of an "A" check digit of ten on relays 43 and 41 and a "B" check digit of six on relays 52 and 53.

The next entry is of the value seven, and as this value is sensed contacts P7 (Figure 1) are closed and then cam contacts C5, C6 and C7 close to complete the entry circuits into the networks of Figures 2 and 3. Considering the digit circuit network of Figure 2 first, the closing of contacts C5 completes a circuit from line 34 contacts C5, 32A, P7, 56J, 55I, 54M to the twelve value line L12 of Figure 1. This same value line L12 in Figure 2 is connected through contacts 43N (reversed) to the seven value line so that the circuit completed by contacts C5 continues through contacts 42I to contacts 41I (reversed), to the nine value line, and through contacts 40k, line L9', rectifiers L9A and L9B and the pick-up windings of transfer relays 37 and 38 to return line 39.

It will be recalled that upon the previous entry of the value six the transfer relays 36 and 38 were operated by the closing of cam contacts C5 and held operated after contacts C5 opened by means of their hold windings the circuits for which were completed over contacts C6. When contacts C8 are closed however the transfer relays have completed their function so that they can be released, and, as will be seen from the timing diagram of Figure 4, this is effected by the opening of contacts C6 shortly after contacts C8 close. Thus relays 36 and 38 are in the unoperated state again at the time the next digit is entered. The energisation of the pick-up windings 37P' and 38P' from line L9' thus operates these transfer relays to register the value twelve, which is held on these relays until contacts C6 open again. In the meantime, contacts C8 open to interrupt the holding circuits of the storage relays 41 and 43 storing the check digit derived from the previous entry, then contacts C7 close to energise the pick-up windings of the storage relays 42 and 43 corresponding to transfer relays 37 and 38 and these storage relays are held operated by the subsequent closing of the C8 contacts.

Thus each check digit calculated from a preceding input digit is replaced by a new check digit, as it is calculated from a succeeding input digit, by the operation of the cam controlled contacts C5–C8.

Considering now the networks of Figure 3 which constitute the "B" calculator, the position upon the closing of contacts C5 to enter the value seven is that since relays 41, 43, 52 and 53 are operated their contacts in the lower network are reversed. Thus the closing of contacts C5 extends a circuit from line 34 through contacts C5, 32A, 43P (reversed), 42Q, 41R (reversed), 40T, 53B (reversed), 52F (reversed), 51H, rectifiers 69, 70, windings 49P' and 50P' to line 39. Relays 49 and 50 are thus operated and at their contacts 49A and 50A complete circuits for their hold windings 49H' and 50H' over contacts C6. Relays 49 and 50 in operating reverse their contacts 49B–D and 50B in the upper network of Figure 3.

The closing of contacts C5 also completes a circuit for entering the value seven into the "B" calculator. This circuit extends from contacts P7 over line X7, through the rectifiers associated with this line, contacts 56K, 55J and winding 47P' to line 39, and contacts 56M, 55L and winding 45P' to line 39. Relays 47 and 45 are thus energised and hold over their "A" contacts.

As previously explained the closing of contacts C5 in conjunction with the closing of contacts P7 extends a circuit from line 34 to the twelve value line L12 at the input to the network of Figure 2. Since however contacts 43O are closed, this circuit is branched through an isolating rectifier connected to L12, through contacts 43O to line 58 which is connected to the pick-up winding 44P' of a carry relay 44 associated with the upper network of Figure 3. It will be noted that lines L5—L12, L9—L12, L11 and L12, and L12 are connected through individual isolating rectifiers and the 0 contacts of relays 43, 42, 41 and 40 respectively to line 58 so that relay 44 is energised whenever the circuit set up by the entry of a digit includes one of the groups of lines mentioned and one of the "A" digit storage relays is operated.

The operation of relay 44 completes at 44A a hold circuit for its hold winding 44H' from line 34 over contacts C6, and reverses the contacts 44 B–H in the upper network of Figure 3. Thus when contacts C7 are closed the upper network of Figure 3 is already conditioned by the reversal of the contacts of relays 44, 45, 47, 49 and 50 and the circuit from line 34 extends through contacts C7, 57B, 50B (reversed), 47C (reversed), 49C (reversed), 46E, 48E, 45E (reversed), 44F (reversed), and winding 51P' to line 39. Relay 51 is thus operated to register a "B" digit of one and completes a hold circuit over its "A" contacts and contacts C8.

At the end of the entry of the value seven an "A" check digit of twelve is registered by relays 43 and 42 and a "B" check digit of one is registered by relay 51.

The next entry made is of the letter "A" which is coded as Y1, the zone "Y" having a digital value of three in the tens denomination. The sensing of the "Y" zone punching is arranged to operate two relays 54 and 55 which are individually responsive to detection of an "X" zone and an "O" zone punching respectively and correspond to the digital values one and two in the tens denomination. It will be appreciated that a separate relay could be arranged to respond to the detection of a "Y" zone punching but the use of both the "O" and "X" relays effects an economy in apparatus. With relays 54 and 55 operated contacts 54A to M and 55A to I in the network of Figure 1 are reversed, contacts 54N and 54O in the "B" calculator entry circuit of Figure 1 are opened and closed respectively and contacts 55J to L in this circuit are reversed.

The sensing of the numerical digit "one" operates the one pin relay to close contacts P1 and the subsequent closing of contacts C5 completes a path from line 34 through contacts C5, 32A, P1, 56I, 55H (reversed), 54E (reversed) to line L3. This circuit extends from line L3 in Figure 2 through contacts 43E (reversed) to the eleven value line, through contacts 42M (reversed) to the two value line, through contacts 41D and 40D, line L2', the rectifiers L2A, L2B and L2C and the windings 35P', 36P', and 37P' to line 39.

Relays 35, 36 and 37 are thus energised and subsequently transfer the value seven, which they represent, to the storage relays 40, 41 and 42.

From the eleven value line this circuit also branches off through an associated isolating rectifier and contacts 42O to line 58 to operate relay 44 (Figure 3) as before.

The closing of contacts C5 also completes a circuit from line 34 through contacts C5, 32A and P1 to the "B" calculator entry circuit of Figure 1.

It will be seen that there is no line leading from contacts P1 to the O column of rectifiers and that with relay 55 operated there is no connection between the X column of rectifiers and the transfer relays 45, 46 and 47. There is thus no entry circuit for the value Y1 and the transfer relays thus effectively register zero.

In the lower network of Figure 3 the closing of contacts C5 also extends a circuit from line 34 through contacts C5, 32A, 43P (reversed), 42Q (reversed), 53H, 52H, 51H (reversed) to the unconnected zero line of this network so that relays 48, 49 and 50 are unaffected.

The total effect of the closing of contacts C5 in this entry operation is to operate the transfer relays 35, 36 and 37, and to operate the carry relay 44.

When contacts C7 close a circuit is completed from line 39 through contacts C7, 57B, 50B, 47B, 49B, 46B, 48B, 45B, 44B (reversed), rectifiers 59 and 60 and windings 51P' and 52P' to line 39. Relays 51 and 52 thus operate and complete hold circuits for their hold windings 51H' and 52H' over contacts 51A and 52A to cam contacts C8. Relays 51 and 52 thus stores a "B" check digit vaule of three until contacts C8 open again. Contacts C7 also bring about the transfer of the "A" check digit from relays 35, 36 and 37 to relays 40, 41 and 42 which are subsequently held over cam contacts C8.

The closing of contacts C8 holds the registration of an "A" check digit of seven on storage relays 40–43 and of a "B" check digit of three on the storage relays 51–53, those of relays 35–38 and 44–50 which were operated being released by the opening of cam contacts C6 shortly after contacts C8 close.

To enter the next character E which is represented by a zone punching of "X" and a numerical punching of two, to represent the value twenty-two, the circuit of the "X" relay 54 is energised and contacts P2 are closed. Thus when contacts C5 close a circuit is completed from line 34 through contacts C5, 32A, P2, 56G, 55F, 54J (reversed) to line L8.

From line L8 of Figure 2 the circuit continues through contacts 43J, 42J (reversed), 41N (reversed), 40C (reversed), line L2', rectifiers L2A, L2B and L2C, and windings 35P', 36P' and 37P' to line 39. Relays 35, 36 and 37 are thus operated to register the value seven. A branch circuit from contacts 42J (reversed) extends through an isolating rectifier, and contacts 41O (closed) to line 58 to operate the carry relay 44 as before.

No "B" calculator input circuit extends from contacts P2 through the X column of rectifiers so that in effect an entry of zero is recorded on the relays 45–47.

The circuit from contacts C5 through the lower network of Figure 3 extends through contacts 32A, 43P, 42P (reversed), 41Q (reversed), 53C, 52C (reversed), 51E (reversed), and winding 50P' to line 39. Relay 50 is thus operated and completes its own holding circuit as previously described.

When the contacts C7 next close, the contacts of relays 44 and 50 are reversed in the upper network of Figure 3 so that the circuit from contacts C7 extends through contacts 57B, 50B (reversed), 47C, 49D, 48F, 45F, 44F (reversed) and winding 51P' to line 39. Relay 51 thus operates to store a "B" check digit of 1 and completes its own holding circuit over contacts C8.

The next entry is of the numerical value three and the "A" calculator entry circuit established, with contacts P3 closed, when contacts C5 close, extends from the latter contacts through contacts 66E, 55D, 54H to line L7, then (Figure 2) contacts 43I, 42I (reversed), 41M (reversed), 40B (reversed), line L1', rectifiers L1A and L1B and windings 36P' and 38P' to line 39. Relays 36 and 38 operate to register an "A" check digit of ten. The carry relay 44 is operated over line 58 from contacts 42I (reversed) through contacts 41O (closed).

The "B" calculator entry circuit extends from contacts P3 over line X3, contacts 56K and 55J and winding 47P' to line 39. Relay 47 is thus operated and reverses its contacts in the upper network of Figure 3.

With relays 42, 41, 40 and 51 operated the circuit through the lower network of Figure 3 extends from contacts C5 through contacts 32A, 43P, 42P (reversed), 41Q (reversed), 53C, 52C, 51C (reversed) and winding 49P' to line 39. Relay 49 is thus operated and reverses its contacts in the upper network.

Thus when contacts C7 next close the circuit through the upper network of Figure 3 extends from contacts C7 through contacts 57B, 50B, 47B (reversed), 49D (reversed), 46G, 48H, 45H and 44H (reversed) to the open contacts 71B so that relays 51–53 remain unaffected and a B check digit of zero is registered.

At the end of the entry of the value three an "A" check digit of ten is stored by relays 40–43 and a "B" check digit of zero is effectively stored by relays 51–53.

The final entry is of the numerical digit one, and the closing of contacts C5, with contacts P1 closed, completes a circuit from the latter contacts through contacts 56I, 55H, 54L to line L11, then (Figure 2) contacts 43M (reversed), 42H, 41H (reversed), 40J, line L8', rectifier L8A and winding 36P' to operate relay 36 and register a final "A" check digit of two.

The carry relay 44 is operated from line L11 through the associated isolating rectifier, contacts 43O (closed) and line 58.

The circuit set up in the lower network of Figure 3 extends from contacts C5 through contacts 32A, 43P (reversed), 42Q, 41R (reversed), 40T, 53B, 52B and 51B to an open line so that there is in effect a zero entry registered on relays 48–50.

The "B" calculator entry circuit extends from contacts P1 over line X1, the rectifiers associated with this line, contacts 56M, 55L and winding 45P' to line 39, and contacts 56L, 55K and winding 46P' to line 39. Relays 45 and 46 are thus operated and reverse their contacts in the upper network of Figure 3.

Upon the next closing of contacts C7 a circuit is extended from these contacts through contacts 57B, 50B, 47B, 49B, 46B (reversed), 48D, 45D (reversed), 44E (reversed), rectifiers 63 and 64, and windings 51P' and 53P' to line 39. Relays 51 and 53 operate to register a "B" check digit of five.

The check digit of the entered combination 67AE31 is 60 i.e.

$$\frac{\begin{array}{r}67\\31\\2231\\\hline 703231\end{array}\times 960}{91}=7418700+R.60$$

and this value is now entered into the device. Since however it is the check digit that is being entered and not two further digits of the combination the entry circuit has to be modified and this is effected by the energisation of relays 56 and 57 (Figure 1) over the lines CDT and CDU as the tens and units digits respectively of the check digit are entered. The lines CDT and CDU are connected via a plugboard to an emitter (shown in Figs. 21 and 22 of the aforementioned British Patent 621,697) which causes these lines to be energized when the tens and unit denominations respectively are being entered.

Relay 56 is operated as the tens digit of six is entered and both relays 56 and 57 are operated as the units digit of zero is entered, by virtue of the rectifier connecting the lines CDT and CDU.

The operation of relay 56 reverses its contacts 56B–J in the "A" calculator input circuit and its contacts 56K–M in the "B" calculator input circuit, so that when contacts C5 close, with contacts P6 closed to enter the value six, the "B" calculator entry circuit extends from contacts C5 through contacts P6 line CD6, the rectifier associated with that line, contacts 56L (reversed) contacts 55K, winding 46P' to line 39. Relay 46 is thus operated and reverses its contacts in the upper network of Figure 3.

The "A" calculator entry circuit extends from contacts P6 through contacts 56B (reversed), 55H and 54L to line L11, then (Figure 2) through contacts 43M, 42M, 41M (reversed), 40B and winding 71P' to line 39. Relay 71 is thus operated and at its "A" contacts completes a hold circuit to contacts C6. None of the "A" check digit storage relays is affected by this entry so that there is an effective registration of zero as the "A" check digit.

Relay 44 is operated from line L11 through contacts 41O and over line 58. The circuit through the lower network of Figure 3 extends from line 34, through contacts C5, 32A, 43P, 42P, 41P (reversed), 40Q, 53H (reversed), 52E, 51E (reversed), and winding 50P' to line 39. Relay 50 is thus operated and completes its own hold circuit to contacts C6.

Thus in the upper network of Figure 3 the contacts of relays 44, 46 and 50 are reversed and when contacts C7 close a circuit is extended from line 34 through contacts C7, 57B, 50B (reversed), 47C, 49D, 46F (reversed), 48H, 45H, 44H (reversed), and contacts 71B (closed) to the open contacts 57C so that relays 51–53 are unaffected. A "B" check digit of zero is therefore effectively registered.

The units digit of the check digit 60 is now entered by closing contacts P0. This extends a circuit, when contacts C5 close, from line 34 through contacts C5, 32A, P0 over line L0, through contacts 54A, 43B, 42B, 41B, 40B and winding 71P' to line 39. Relay 71 is again operated, having released when contacts C6 opened its hold circuit and relays 40–43 being unaffected, register an "A" check digit of zero.

There are no circuits from contacts P0 to the "B" calculator entry circuit so that zero is effectively registered by relays 45–47, and since both the "A" and "B" digits resulting from the entry of the value six were zero the lower network of Figure 3 registers zero on relays 48–50.

Thus when contacts C7 close a circuit extends from line 34 through contacts C7 and contacts 57B, which are reversed due to the operation of relay 57 when the units digit of the check digit 60 is entered, contacts 33A (reversed), 50B, 47B, 49B, 46B, 48B, 45B, 44B, 71B (closed), 57C (closed) and the winding of a relay 72 the operation of which indicates agreement between the check digit calculated by the device and the entered check digit.

I claim:

1. Data checking apparatus comprising first and second calculators, means for applying data signals to said calculators, said first calculator being responsive to signals applied thereto to divide the numerical equivalent of said signals by a first factor, to produce a quotient signal and to store a remainder value, and means for transferring said quotient signal to said second calculator, said second calculator being responsive to said quotient signal and to data signals applied thereto to divide by a second factor the value represented by the sum of said quotient signals and a further quotient signal produced in said second calculator in response to said data signals and representing the quotients obtained on dividing by said first factor the remainder obtained on dividing the numerical equivalent of the data signals by the product of said first and second factors and to register a remainder value.

2. Apparatus for checking the accuracy of electrical signals representative of a group of characters which are selected from a plurality thereof each of which has associated with it a distinct numerical value in a main radix of notation by calculating the remainder formed on dividing the equivalent numerical value of the group in said main radix of notation by a predetermined whole number which itself is the product of a first factor and a second factor, the apparatus comprising an entry register to which the signals are fed character by character, a first calculator operating with said first factor as radix and a second calculator operating with said second factor as radix, the first calculator comprising input means coupled to the entry register and responsive to the entry of each character to produce first remainder signals representing the remainder formed by dividing the associated numerical value by said first factor, first value storage means, adding means which is coupled to said input means to receive said first remainder signals and which is conditioned by the first value storage means to add the value stored therein in response to the entry of previous characters of the group to the value represented by the first remainder signals to produce a first sum signal and a carry signal where appropriate, means coupled to the adding means for registering the production of a carry signal and means coupled to the adding means for converting the first sum signal to a second remainder signal representing the remainder formed on multiplying said sum signal by said main radix and dividing by said first factor and for feeding the second remainder signal to the first value storage means and the second calculator comprising input means responsive to the entry of each character to produce a quotient signal representing the quotient formed on dividing by said first factor the remainder formed on dividing the associated numerical value by said predetermined whole number, second value storage means, adding means which is coupled to said input means to receive said quotient signals and which is conditioned by said second value storage means and said first calculator to form a second sum signal representing the sum of the quotient, the value registered in said second value storage means in response to previous characters of the group, unity if there is a carry registered in said carry registering means of said first calculator and the quotient formed on forming said second remainder signal in said first calculator, means coupled to the adding means for converting the second sum signal to a third remainder signal formed on multiplying it by said main radix and dividing by said second factor and for feeding the third remainder signal to the second storage means, the apparatus further including means for indicating equivalence of the values stored in said first and second value storage means taken in combination after entry of the last character of a group, to the remainder formed on dividing the numerical value by said predetermined number.

3. Apparatus for checking the accuracy of electrical signals representative of a group of characters which are selected from a plurality thereof each of which has associated with it a distinct numerical value in a main radix of notation by calculating the remainder formed on dividing the equivalent numerical value of the group in said main radix of notation by a predetermined whole number which itself is the product of a first factor and a second factor, the apparatus comprising an entry register to which the signals are fed character by character, a first calculator operating with said first factor as radix and a second calculator operating with said second factor as radix, the first calculator comprising input means coupled to the entry register and responsive to the entry of each character to produce first remainder signals representing the remainder formed by dividing the associated numerical value by said first factor, first value storage means, adding means which is coupled to said input means to receive said first remainder signals and which is conditioned by the first value storage means to add the value stored therein in response to the entry of previous characters of the group to the value represented by the first remainder signals to produce a first sum signal and a carry signal where appropriate, means coupled to the adding means for registering the production of a carry signal and means coupled to the adding means for converting the first sum signal to a second remainder signal representing the remainder formed on multiplying said sum signal by said main radix and dividing by said first factor and for feeding the second remainder signal to the first value storage means and the second calculator comprising input means responsive to the entry of each character to produce a quotient signal representing the quotient formed on dividing by said first factor the remainder formed on dividing the associated numerical value by said predetermined whole number, second value storage means, adding means which is coupled to said input means to receive said quotient signals and which is conditioned by said second value storage means, said carry signal registering means and said first value storage means to form a second sum signal representing the sum of the quotient, the value registered in said second value storage means in response to previous characters of the group, unity if there is a carry registered in said carry registering means and the quotient formed on forming said second remainder signal in the first calculator in response to the entry of the previous character, means coupled to the adding means for converting the second sum signal to a third remainder signal formed on multiplying it by said main radix and dividing by said second factor and for feeding the third remainder signal to the second storage means, the apparatus further including means for indicating equivalence of the values stored in said first and second value storage means taken in combination after entry of the last character of a group to the remainder formed on dividing the numerical value by said predetermined number.

4. Apparatus according to claim 3 in which said equivalence indicating means comprises means for entering signals representative of the remainder formed on dividing the equivalent numerical value of the group by said predetermined whole number digit by digit into said entry register, means for modifying the input means of both the first and the second calculator to convert such digit representing signals to predetermined value representing signals which are fed to said adding means in place of said first remainder signal and said quotient signal respectively, and means controlled by said first and second storage means to indicate when the values stored by both are zero simultaneously.

References Cited in the file of this patent

UNITED STATES PATENTS

| | | |
|---|---|---|
| 2,731,199 | Ghertman | Jan. 17, 1956 |
| 2,755,022 | Knutsen | July 17, 1956 |
| 2,765,982 | Knutsen | Oct. 9, 1956 |
| 2,781,971 | Knutsen | Feb. 19, 1957 |
| 2,896,848 | Miehle | July 28, 1959 |

FOREIGN PATENTS

| | | |
|---|---|---|
| 740,007 | Great Britain | Nov. 9, 1955 |

OTHER REFERENCES

"Description of a Relay Calculator," Harvard University Computation Laboratory, 1949 (note especially Figure 1.1, Organization of the calculator).